(12) United States Patent
Field

(10) Patent No.: US 9,382,141 B2
(45) Date of Patent: Jul. 5, 2016

(54) METHOD AND APPARATUS FOR THE CONTINUOUS TREATMENT OF A WATER WELL

(76) Inventor: George Raymond Field, Edmonton (CA)

(*) Notice: Subject to any disclaimer, the term of this patent is extended or adjusted under 35 U.S.C. 154(b) by 614 days.

(21) Appl. No.: 12/591,418

(22) Filed: Nov. 19, 2009

(65) Prior Publication Data

US 2010/0270024 A1  Oct. 28, 2010

(51) Int. Cl.
| | |
|---|---|
| *C02F 1/72* | (2006.01) |
| *C02F 1/76* | (2006.01) |
| *E03B 3/15* | (2006.01) |
| *E21B 33/068* | (2006.01) |

(52) U.S. Cl.
CPC . *C02F 1/722* (2013.01); *C02F 1/76* (2013.01); *E03B 3/15* (2013.01); *E21B 33/068* (2013.01)

(58) Field of Classification Search
CPC .............. C02F 1/50; C02F 1/722; C02F 1/76; E03B 3/15; E21B 37/06; E21B 33/068; E21B 43/00; E21B 7/00
USPC ......................... 166/310, 311, 312, 369, 85.2; 285/139.1, 139.3, 139.2, 143.1, 136.1, 285/219, 220; 210/754, 756, 747.8, 170.07, 210/209, 206
See application file for complete search history.

(56) References Cited

U.S. PATENT DOCUMENTS

| | | | | | |
|---|---|---|---|---|---|
| 3,785,525 | A | * | 1/1974 | Handeland | 221/265 |
| 4,676,399 | A | * | 6/1987 | Burckhardt | 221/207 |
| 5,025,822 | A | * | 6/1991 | Guggisberg | 137/1 |
| 5,099,917 | A | * | 3/1992 | Roser | 166/51 |
| 5,709,266 | A | * | 1/1998 | Kruse | 166/75.15 |
| 6,349,765 | B1 | * | 2/2002 | Meyers et al. | 166/85.2 |
| 2003/0019635 | A1 | * | 1/2003 | Acheson | 166/379 |
| 2004/0168795 | A1 | * | 9/2004 | Owens | 166/75.13 |
| 2007/0108223 | A1 | * | 5/2007 | Behrens | 221/263 |

* cited by examiner

*Primary Examiner* — Elizabeth Gitlin
(74) *Attorney, Agent, or Firm* — George A. Seaby

(57) ABSTRACT

An apparatus for the continuous treating of a water well with chlorine or hydrogen peroxide includes an inlet pipe, which is mounted in the cover on a water well and an elongated tube extending downwardly from the bottom end of the pipe into the well, preferably beyond any pitless adaptor, for depositing chlorine pellets or chlorine or hydrogen peroxide solution in the well. The pellets or solution are added roughly on a weekly basis which prevents a chlorine or hydrogen peroxide smell in the water.

8 Claims, 3 Drawing Sheets

METHOD AND APPARATUS FOR THE CONTINUOUS TREATMENT OF A WATER WELL

BACKGROUND OF THE INVENTION

1. Field of the Invention

This invention relates to a method and apparatus for the continuous treatment of a water well.

In general, the treating of water wells is effected sporadically using a method known as shock chlorination. Shock chlorination commonly involves the steps of pumping up to 200 gallons or more of water from a well, dumping large quantities of chlorine into the pumped water, dumping large quantities of chlorine into the well, pouring the pumped water back into the well, then letting the chlorine sit in the well overnight and finally pumping water from the well until the chlorine is removed, i.e. until the chlorine smell is gone. Shock chlorination is sometimes done every one to six months, but usually much less frequently because it is so unpleasant. When using the shock chlorination technique, it is necessary to shut down a well for an extended period, and following shock chlorination the taste and smell of chlorine make the water unpalatable, and it often takes days to become palatable. Large doses of chlorine can have an adverse effect on well hardware such as pitless adaptors, metal well casings and some pumping equipment which are used in most water wells in North America. With most existing well chlorinating methods, filtering of water leaving the well is necessary to remove precipitates and chlorine from the water, but is rarely done. Moreover, shortly after the chlorine is pumped from the well, problems requiring shock chlorination for a solution reappear. Thus, the objectives of chlorination have been only marginally achieved using shock chlorination techniques. Not only is shock chlorination expensive, but it is functionally inadequate and ineffective.

2. Description of Related Art

A variety of apparatuses have been proposed for periodically adding chlorine or other chemicals to a well each time water is removed from the well. Examples of such apparatuses are described in Canadian Patent No. 1,255,265 which issued to K. D. Behrens on Jun. 6, 1989, and U.S. Pat. No. 3,785,525, issued to G. A. Handelhand on Jan. 15, 2974 and U.S. Pat. No. 5,709,266 issued to G. H. Kruso on Jan. 20, 1998. Aside from being expensive and sticking up above the top of the well, the patented devices are substantially more complicated and are designed for a purpose differing from that of the present invention. By dropping chlorine into the top of a well containing a pitless adaptor, there is a distinct probability that the chlorine will land on and corrode the pitless adaptor.

Existing devices for chlorinating wells were designed for purposes differing from that of the present invention. While earlier inventions use chlorine in various forms, e.g. pellets or liquid to chlorinate wells, the similarity of such inventions to the method, the purpose and the apparatus of the present invention ends there.

BRIEF SUMMARY OF THE INVENTION

The present invention solves the above-mentioned problems by providing a relatively simple apparatus and method for treating a water well in which chlorine or hydrogen peroxide is admitted to the well in regular, relatively small doses beneath the level of the pitless adaptor.

The main purpose of the present invention is to replace traditional shock chlorination techniques with an effective, economical method and apparatus. Without the apparatus and method described herein, nothing will achieve the results that governments and industry all over North America have for generations been unsuccessfully attempting to achieve. In other words, putting it simply, the purpose of the present invention is to provide a simple, inexpensive and effective method and apparatus for achieving desired results, which have not been achieved by traditional shock chlorination.

According to one aspect, the present invention relates to an apparatus for treating a water well containing a pitless adaptor comprising an inlet pipe for mounting in a cap on a water well; and a tube for connection to a bottom end of said inlet pipe, said tube being a sufficient length to extend downwardly into the water well above or below the level of the pitless adaptor, the tube having a bottom discharge end which is vertically out of alignment with the pitless adaptor.

In accordance with another aspect the invention relates to a method of consistently and continuously treating a water well containing a pitless adaptor comprising the steps of providing an inlet pipe in a cover of a water well and a tube extending downwardly from the pipe to above or below the pitless adaptor, the tube having a bottom discharge end out of alignment with the pitless adaptor; and manually dropping two to twelve chlorine pellets, or an appropriate chlorine or hydrogen peroxide solution into the inlet pipe on a predetermined regular basis depending on the depth and condition of the well.

DETAILED DESCRIPTION OF THE INVENTION

Figure 1:
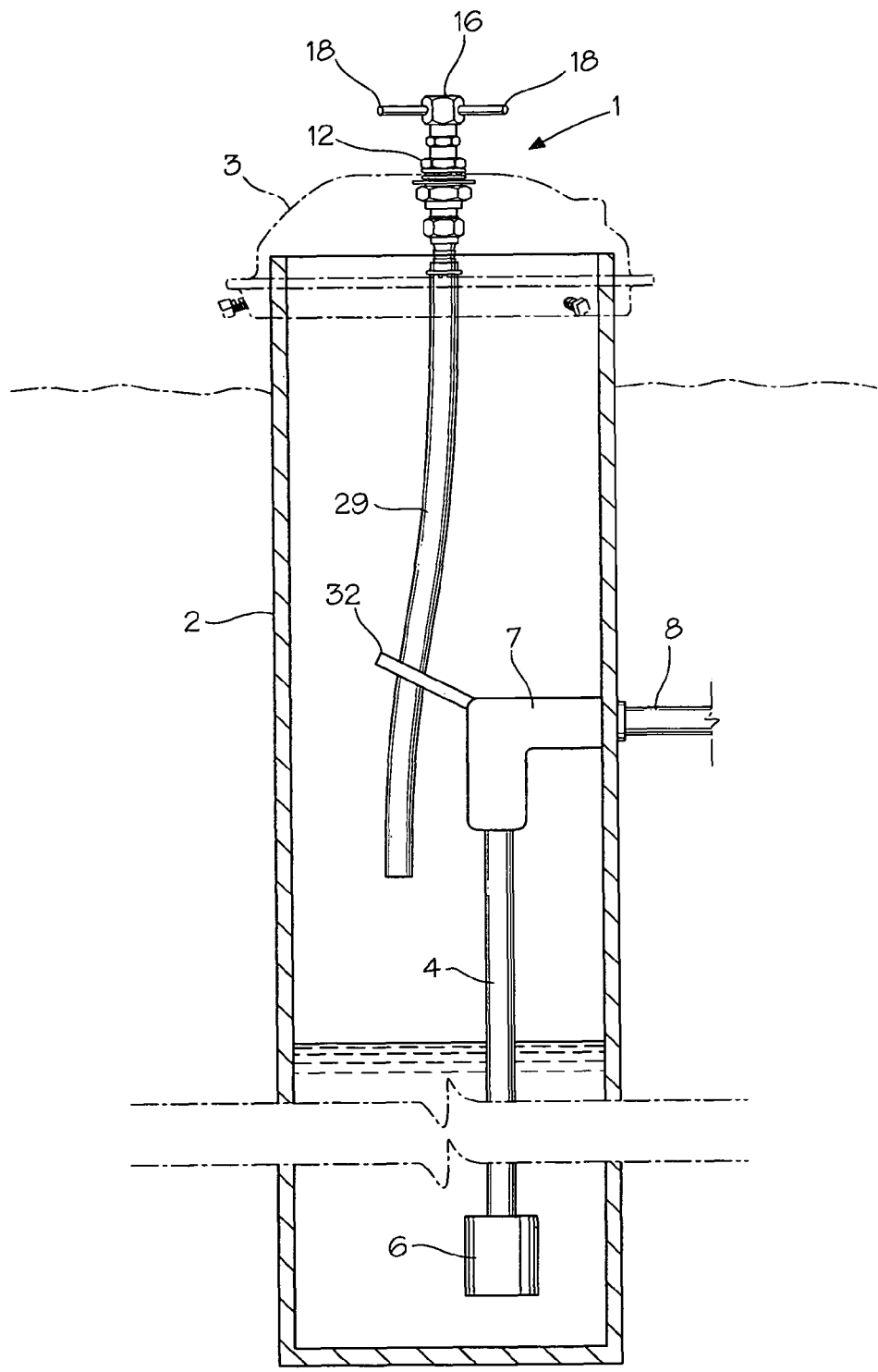
FIG. 1 is a longitudinal sectional view of a water well incorporating the well treating apparatus of the present invention.

Referring to FIG. 1, the apparatus of the present invention which is indicated generally at 1 is intended for use in a water well system of the type including a tubular casing 2 extending into the ground. A cover 3 closes the top end of the casing 2. Water in the well is pumped through a drop pipe 4 by a pump 6 and passes through a pitless adaptor 7 to a service line 8. The line 8 carries the water to the plumbing system (not shown) in a building.

Figure 2:
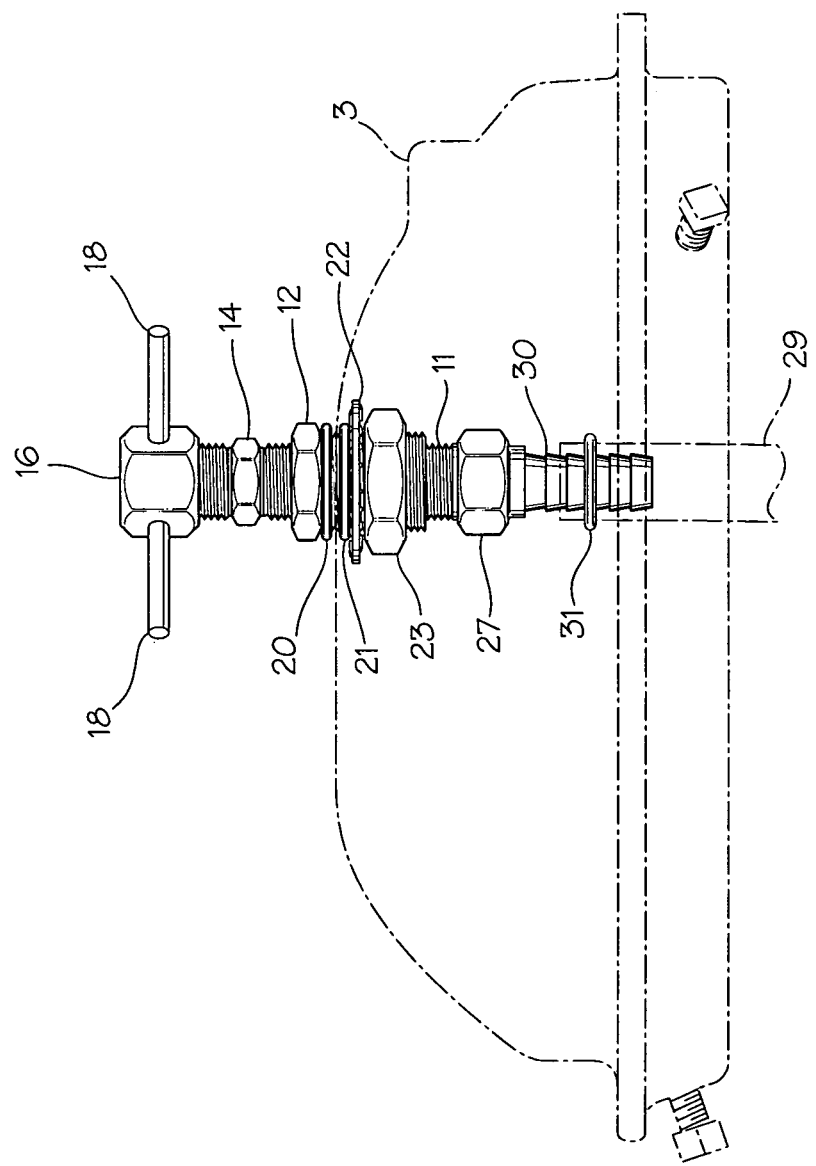
FIG. 2 is a side view of the apparatus of FIG. 1 on a larger scale.
Figure 3:
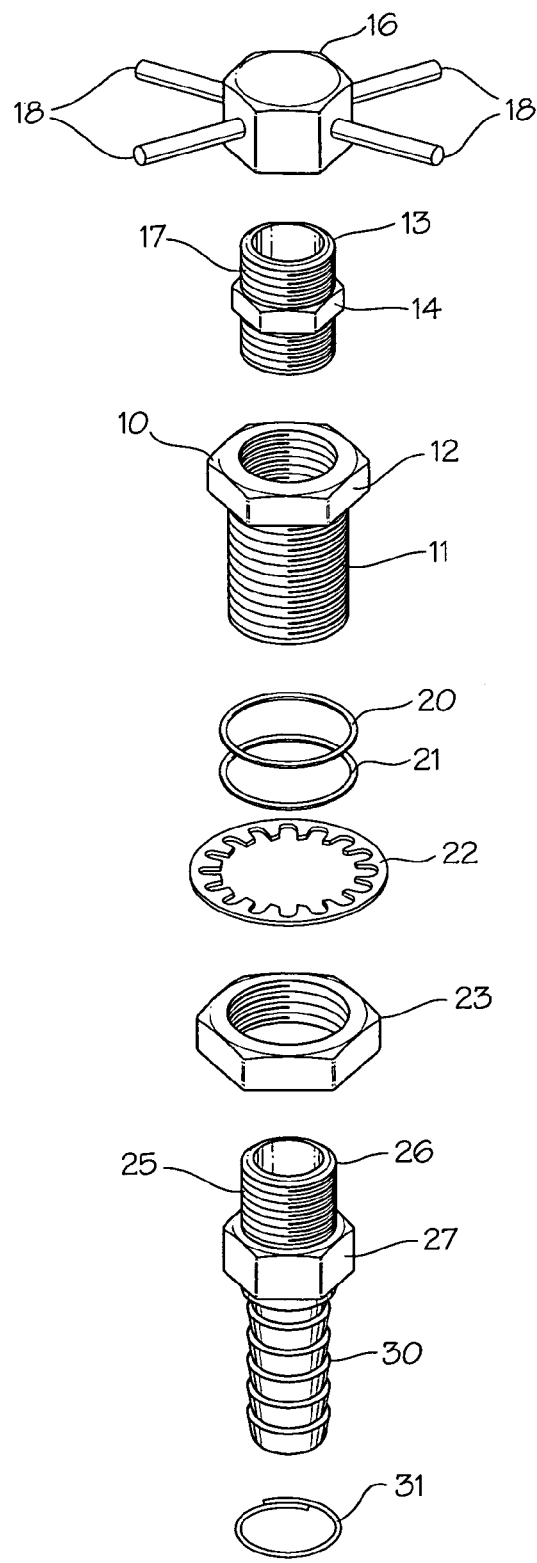
FIG. 3 is an exploded isometric view of the apparatus of FIGS. 1 and 2.

The apparatus 1 of the present invention is mounted in the cover 3. As best shown in FIGS. 2 and 3, the apparatus 1 includes a nut 10 which a tubular body 11 extending through the cover 3. The tubular body 11 is threaded externally, and the body and a hexagonal head 12 integral with the body 11 are threaded internally. An externally threaded nipple 13 is mounted in the top end of the nut 10 above the cover 3. A central hexagonal flange 14 at the center of the nipple 13 is used to rotate the nipple while it is mounted in the nut 10. An internally threaded hexagonal cap 16 is mounted on the externally threaded top end 17 of the nipple 13. The threads (not shown) in the cap 16 are coated with petroleum jelly, which acts as a seal and makes it easy to remove the cap. Four handles defined by rods 18 extend outwardly from diametrically opposed faces of the cap 16 for facilitating manual rotation of the cap when removing or applying it to the nipple 13. Petroleum jelly (not shown) is used on the internal threads of the cap 16 to provide a good seal and to make it easy to remove the cap.

When assembling the well treating apparatus, the nut 11 is inserted through an o-ring 20 into a hole (not shown) in the cap 3. A second o-ring 21, a lock washer 22 and a nut 23 are placed on the threaded bottom end of the nut 11 to secure the nut in the cap 3. The externally threaded top end 25 of a hose coupler 26 is screwed into the bottom end of the nut 11, and tightened in position using a hexagonal flange 27. A hose 29 (FIG. 1) is attached to the barbed bottom end 30 of the coupler 26 using a spring clip 31. The hose 29 extends downwardly into the well casing 2 a short distance beyond the pitless adaptor 7. The hose 29 is held in position by an arm 32 extending outwardly from the pitless adaptor 7.

In use, the cap 16 is simply removed and 2-12 chlorine pellets are dropped into the well via the hose 29. Alternatively, a funnel (not shown) is inserted into the top of the nipple 13 and an appropriate chlorine or hydrogen peroxide solution is poured into the well via the hose 29. As mentioned above, the pellets are usually added only once a week, but may be added more or less frequently depending on conditions in the well. Typically, four pellets are added to a 60 foot well, 5 pellets to a well of over 60 and up to 200 feet and 6 to 7 pellets to a well of over 200 and up to 400 feet well depending upon the volume of water in the well. In a heavily contaminated well, a regime which has been found to be effective is to add 10 pea size pellets each of the first three days, followed by 4 to 7 (or more) pellets once a week, and possibly more or less frequently depending upon conditions in the well. Because of the small quantity of chlorine (the pellets are approximately 72% chlorine) there is no chlorine odor emanating from the water taken from the well. It will be appreciated that the pellets can be replaced with a liquid chlorine or hydrogen peroxide solution, which would be added to a well using a funnel. The quantity of chlorine or hydrogen peroxide solution used is chosen to have the same effect as the chlorine pellets. The chlorine (or hydrogen peroxide) added to the well is sacrificed, i.e. dispersed in the well water and accordingly no dechlorination or other treatment is required. The chlorine or hydrogen peroxide kills and prevents the growth of algae and other organisms in the wells. Moreover, when chlorine or hydrogen peroxide is used, it kills any sulfate reducing bacteria in the well, there is no sulfur smell in the water taken from the well, and organisms classified as iron bacteria will not grow in well.

Thus, by using the method and apparatus of the present invention, traditional shock chlorination becomes a thing of the past. By using the manual method of the present invention, it is a simple matter to adjust the amount of chlorine or hydrogen peroxide added to a well depending on a variety of conditions such as spring run-off and drought. The chlorination or treatment with hydrogen peroxide can be done in no more that 30 seconds (not counting the walk to the well).

The invention claimed is:

1. A method of continuously treating a water well containing a pitless adaptor with chlorine comprising the steps of providing an inlet pipe in a cover of the water well, a removable cap on the inlet pipe and a tube extending downwardly from the pipe to a level above or below the level of the pitless adaptor, the tube having a bottom discharge end out of alignment with the pitless adaptor and above the water level in the well: manually removing the cap from the inlet pipe on a predetermined regular basis; and injecting chlorine pellets directly through the inlet pipe into the water in the well by manually dropping the pellets into the inlet pipe so that the pellets directly enter water in the well, the quantity of chlorine being sufficient to prevent the growth of algae and other organisms, and being sacrificed in the well water such that water pumped from the well does not have a chlorine odor following injection of the chlorine, wherein four chlorine pellets having a concentration of 72% are added weekly to the well when the well is up to 60 feet deep.

2. The method of claim 1, wherein the tube extends downwardly below the level of the pitless adaptor, whereby the chlorine pellets are introduced below the pitless adaptor.

3. A method of continuously treating a water well containing a pitless adaptor with chlorine comprising the steps of providing an inlet pipe in a cover of the water well, a removable cap on the inlet pipe and a tube extending downwardly from the pipe to a level above or below the level of the pitless adaptor, the tube having a bottom discharge end out of alignment with the pitless adaptor and above the water level in the well: manually removing the cap from the inlet pipe on a predetermined regular basis; and injecting chlorine pellets directly through the inlet pipe into the water in the well by manually dropping the pellets into the inlet pipe so that the pellets directly enter water in the well, the quantity of chlorine being sufficient to prevent the growth of algae and other organisms, and being sacrificed in the well water such that water pumped from the well does not have a chlorine odor following injection of the chlorine, wherein five chlorine pellets having a concentration of 72% are added weekly to the well when the well is over 60 and up to 200 feet deep.

4. The method of claim 3, wherein the tube extends downwardly below the level of the pitless adaptor, whereby the chlorine pellets are introduced below the pitless adaptor.

5. A method of continuously treating a water well containing a pitless adaptor with chlorine comprising the steps of providing an inlet pipe in a cover of the water well, a removable cap on the inlet pipe and a tube extending downwardly from the pipe to a level above or below the level of the pitless adaptor, the tube having a bottom discharge end out of alignment with the pitless adaptor and above the water level in the well: manually removing the cap from the inlet pipe on a predetermined regular basis; and injecting chlorine pellets directly through the inlet pipe into the water in the well by manually dropping the pellets into the inlet pipe so that the pellets directly enter water in the well, the quantity of chlorine being sufficient to prevent the growth of algae and other organisms, and being sacrificed in the well water such that water pumped from the well does not have a chlorine odor following injection of the chlorine, wherein six chlorine pellets having a concentration of 72% are added weekly to the well when the well is over 200 feet deep.

6. The method of claim 5, wherein the tube extends downwardly below the level of the pitless adaptor, whereby the chlorine pellets are introduced below the pitless adaptor.

7. A method of continuously treating a water well containing a pitless adaptor with chlorine comprising the steps of providing an inlet pipe in a cover of the water well, a removable cap on the inlet pipe and a tube extending downwardly from the pipe to a level above or below the level of the pitless adaptor, the tube having a bottom discharge end out of alignment with the pitless adaptor and above the water level in the well: manually removing the cap from the inlet pipe on a predetermined regular basis; and injecting chlorine pellets directly through the inlet pipe into the water in the well by manually dropping the pellets into the inlet pipe so that the pellets directly enter water in the well, the quantity of chlorine being sufficient to prevent the growth of algae and other organisms, and being sacrificed in the well water such that water pumped from the well does not have a chlorine odor following injection of the chlorine, wherein, in a heavily contaminated well, ten chlorine pellets having a concentration of 72% are added to the well for each of three days in succession, followed by four to seven chlorine pellets having a concentration of 72% on a weekly basis.

8. The method of claim 7, wherein the tube extends downwardly below the level of the pitless adaptor, whereby the chlorine pellets are introduced below the pitless adaptor.

* * * * *